S. THOMPSON.
Corn Planter
No. 19,818.  Patented Mar. 30, 1858.
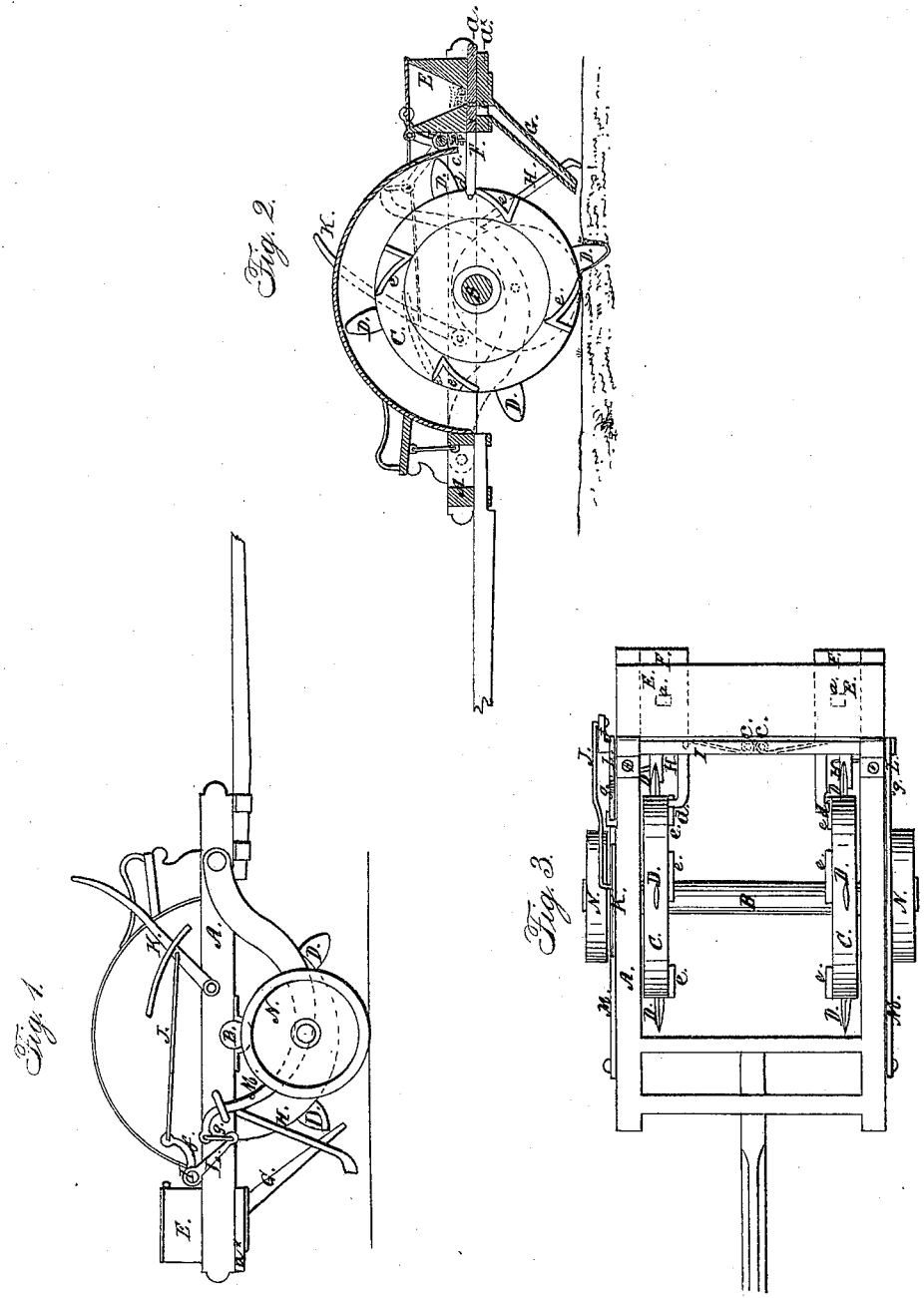

UNITED STATES PATENT OFFICE.

SAMUEL THOMPSON, OF HOPEDALE, OHIO, ASSIGNOR TO HIMSELF AND A. W. TAGGART, OF SAME PLACE.

IMPROVEMENT IN SEED-PLANTERS.

Specification forming part of Letters Patent No. 19,818, dated March 30, 1858.

*To all whom it may concern:*

Be it known that I, SAMUEL THOMPSON, of Hopedale, in the county of Harrison and State of Ohio, have invented a new and Improved Seed-Planting Device; and I do hereby declare that the following is a full, clear, and exact description of the same, reference being had to the annexed drawings, making a part of this specification, in which—

Figure 1 is a side view of my improvement. Fig. 2 is a longitudinal central section of the same. Fig. 3 is a plan or top view of the same.

Similar letters of reference indicate corresponding parts in the several figures.

This invention consists in having a series of cutters attached to the periphery of wheels, which are placed in a framing and combined with reciprocating seed-slides in such a way that the cutters will form holes in the sod to receive the seed dropped by the action of the slides.

This invention is designed to plant seed in newly-broken prairie or similar soil, and to overcome the difficulty attending the planting of seed in such soil having a tough sod on its surface.

To enable those skilled in the art to fully understand and construct my invention, I will proceed to describe it.

A represents a horizontal framing of rectangular form, and having an axle, B, placed transversely in it, said axle having a wheel, C, on each end, the wheels being permanently attached to the axle.

To the periphery of each wheel C a series of cutters, D, four or more, are attached. These cutters project a suitable distance from the peripheries of the wheels and are of lancet form—that is, quite thin in proportion to their breadth—so as to form narrow cuts in the sod over which the wheels pass. (See Fig. 3.)

On the back part of the framing A there are placed two seed-boxes, E E, in the lower part of each of which a slide, F, is placed. These slides are each provided with a hole, *a*, and work over the bottoms $a^x$ of the hoppers, which are also provided each with a hole, *b*, said holes communicating with tubes G, which extend downward to within a short distance of the ground, a tube being directly behind each wheel C. Each slide F has a spring, *c*, bearing against it, and these springs have a tendency to keep the holes *a* of the slides at the bottom of the seed-boxes E E, so as to be filled with seed, the holes *b* in the bottoms $a^x$ being in front of the holes *a*, and cut off from the holes *a* when the slides F are thrown back by the springs *c*. The front end of each slide F is provided with a hook, *d*, as shown clearly in Fig. 3, and to the inner side of each wheel C inclined projections or cams *e* are attached. The form of these projections or cams is plainly shown in Fig. 2. They are placed at equal distances apart, and those on one wheel correspond in position with those on the other.

To the under side of the framing A two bars, H H, are attached, one to each side of the framing. These bars are bent or curved, and extend behind the tubes G G, forming covering devices.

I is a shaft, which is placed transversely in the framing A between the seed-boxes E E and the wheels C C. This shaft has an arm, *f*, attached to one end of it, said arm being connected by a rod, J, with a hand-lever, K, attached to one side of the framing. To each end of the shaft I an arm, L, is attached, and the outer ends of these arms are connected by links *g* to curved bars M M, the front or outer ends of which are pivoted to the framing A. To each bar M a wheel, N, is attached. The form of the bars M is plainly shown in Fig. 1.

The operation is as follows: The seed is placed in the boxes E E and the lever K is thrown back, as shown in Figs. 2 and 3, so as to elevate the wheels N N and allow the framing to be supported by the wheels C C. As the machine is drawn along the cutters D penetrate the sod, and the inclined projections or cams *e*, as the wheels C rotate, draw forward the slides F, so as to bring their holes *a* in line with the holes *b* in the bottoms $a^x$ and the tubes G, the seed the holes *a* contain passing down the holes G into the holes made by the cutters D. As each projection leaves or passes the hooks *d* of the slides the slides are forced back to their original position by the springs *c c*. Thus a reciprocating motion is given the slides F F, and the position of the cutters D on the wheels C must be so arranged relatively with the projections or cams *e*, slides F, and tubes G G that the tubes G will pass directly over the holes made by the cutters D as the holes *a* in the slides F are brought in line with the holes *b*, so that the seed may be dropped into the holes made by the cutters D. The bars H cover the seed or close the apertures or holes made by the cutters D.

When the machine is to be turned at the end of rows, or conveyed from one place to another, the lever K is shoved forward, the wheels N N depressed, and the wheels C consequently raised, so that the machine will be supported by the wheels N N, the wheels C being free from the surface of the ground.

By this invention the tough sod of newly-broken prairie and similar ground may be pierced and seed dropped through the holes upon the soil beneath, and such ground planted with as great facility as that long worked or tilled.

I do not claim separately the reciprocating slides F for distributing the seed, for they are a well-known device and in common use; but,

Having thus described my invention, what I claim as new, and desire to secure by Letters Patent, is—

The cutters D, attached to the wheels C of the framing A, in combination with the seed-distributing slides F, operated by the cams *c*, attached to the cutter-wheels C, substantially as and for the purpose set forth.

SAMUEL THOMPSON.

Witnesses:
G. BINNS,
M. V. C. BINNS.